United States Patent Office 3,444,301
Patented May 13, 1969

3,444,301
PROCESS FOR DESTROYING MICRO-
ORGANISMS IN AGRICULTURE
Carl O. Tant, Edward O. Bennett, and Hugh T. Freebairn, Houston, Tex., assignors to Nalco Chemical Company, Chicago, Ill., a corporation of Delaware
No Drawing. Filed Apr. 13, 1965, Ser. No. 447,877
Int. Cl. A01m 9/12; A23b 7/12
U.S. Cl. 424—303                                   7 Claims

ABSTRACT OF THE DISCLOSURE

Process for destroying micro-organisms found in agriculture, particularly bananas, by contacting them with a biocidal amount of an organic compound having a nitrobutyl sulfate nucleus.

This invention in general relates to processes and compositions for destroying fungi and bacteria which cause a wide variety of diseases of many economically useful plants. It also relates to processes and compositions which inhibit the growth and activities of microorganisms which cause spoilage or rotting of fruits and vegetables during transit and storage times which elapse between harvesting and marketing. The latter are particularly useful in the case of highly perishable tropical fruits and vegetables which of necessity undergo long transit times to temperate zone markets.

Among the most difficult problems encountered in the use of present antimicrobial agents in the treatment of bananas is that the agents now available cause discoloration of the bananas and must be used in concentrations ranging up to 3% to inhibit to any extent the organisms causing spoilage problems. It is known that losses to banana processors resulting from spoilage of the fruit may range as high as 60 percent under present methods of handling and treatment.

One of the most serious problems encountered in the processing of bananas for shipment occurs in the boxing stations located near banana plantations. Most of these stations operate under unusually primitive sanitary conditions and must be sprayed frequently and with extremely high concentrations of presently used banana fungicides in order to maintain any degree of control whatsoever over organisms of the genera Botryodiplodia and Thielaveopsis and related organisms which cause spoilage problems. Furthermore it is desirable to include antimicrobial agents in the water used in washing the bananas. Present antimicrobial agents available are totally inadequate for such washing waters in that they are insoluble in water or the latex produced by the bananas inactivates the compound.

Another problem encountered is that presently used antimicrobial agents, being water insoluble, are inadequate for use in an aqueous medium into which the bananas can be dipped for further disinfection purposes.

Another serious problem is that the more effective of the presently used antimicrobial agents, being relatively incompatible with latex must be used in extremely high concentrations in the paints used to dry and seal the wounds made when the stems of the bananas are cut for packaging purposes. Even when used at such extremely high concentrations the present antimicrobial agents are inadquate to inhibit growth of spoilage organisms completely for even the short lengths of time which are required to transport the green bananas to markets. Consequently during shipment microorganisms beginning to grow on even a single banana which has been inadequately disinfected are known to cause premature ripening of at least the hand of bananas containing the infected one.

An additional problem is that present antimicrobial agents used to disinfect banana storage facilities are capable of producing noxious and dangerous fumes and are corrosive to metal and paint. Consequently, presently used chemicals such as formaldehyde are undesirable as solutions into which banana knives may be dipped between each cut in removing hands from the stalks. The same is true from the standpoint of harvesting the stalks from trees. During this process the machetes must be disinfected between each cut to prevent contaminating the tree with *Pseudomonas solanacearum*, the etiological agent of Moko disease.

Banana trees are highly susceptible to serious bacterial and fungal diseases. It is not unusual for whole plantations to be burned in an effort to control the spread of these diseases. The soil becomes infested with the causative organisms and is unsuitable for replanting for many years, if at all. Present antimicrobial agents do not adequately control either the soil-borne or air-borne phytopathogens responsible for this heavy economic loss.

It would be a valuable contribution to the art if a class of antimicrobial agents were available which were effective in the control of fungi and other microorganisms particularly in processes using waters containing substantial quantities of banana latex and other material which is at present commonly used with antimicrobial agents. Also beneficial would be a group of antimicrobial agents which would act to effectively eliminate or control the organism causing banana spoilage or premature ripening with a low economical dosage. A further benefit would be a group of highly effective antimicrobial agents which could be used in waters utilized in washing and processing bananas, and also would be highly effective when used as disinfectant solutions for the bananas themselves as well as banana processing, shipping and storage facilities. A still further benefit would be a group of antimicrobial agents which would effectively control organisms causing diseases of the banana tree *Musa sapientum* and related species.

It therefore becomes an object of our invention to provide a new process for controlling or eliminating the growth of microorganisms with microbiocides which are effective in the control of banana spoilage causing fungi and bacteria when such are found in the presence of waters containing relatively large amounts of banana latex.

Another object is to provide such control by the use of a microbiocide at low dosage in a liquid medium. Such an object includes controlling the growth of the large variety of microorganisms associated with banana spoilage.

An additional object is to provide economic new and useful banana disinfectants.

A further object is to provide an effective agent and process useful in the disinfection of banana processing, shipment, ripening and storage facilities.

A still further object is to provide effective, economic, new and useful means of controlling the diseases of plants producing bananas.

The compounds which have been found to be effective for the purpose of the invention can be described as nitrobutyl acid sulfates, salts and addition products thereof. These compounds include not only the free nitrobutyl acid sulfate but also the neutralized products thereof. The preferred group of compounds is derived from 2-nitro-1-butyl acid sulfate. The other position isomers are effective.

The most effective products have been derived from racemic mixtures but the individual optical isomers can be prepared and used for the intended purpose. The degree of effectiveness can vary but good results have been obtained with the racemic mixture.

The neutralizing agents can be any basic material that will react with the acidic hydrogen. Examples of suitable neutralizing agents are: the alkali (e.g., sodium and potassium) and alkaline earth (e.g., calcium, stronthium, magnesium), metals, ammonia, primary, secondary and tertiary amines (e.g., monoethanolamine, diethanolamine, triethanolamine, mixtures thereof, methyl amine, dimethyl amine, trimethyl amine, ethylamine, diethylamine, triethylamine, propylamine, dipropylamine, butylamine, dibutylamine, homologues thereof, hexamethylene tetraamine, pyridine, piperidine, morpholine, and the like), cyclic amines (e.g., cyclohexyl amine, dicyclohexyl amine), polyamines (e.g., ethylene diamine, diethylene diamine, dipropylene triamine, phenylene diamine, hydroxyethyl ethylene diamine, and homologues thereof), amido amines (e.g. N-acetyl diethylene triamine), ternary ammonium bases (e.g., tetramethyl ammonium hydroxide), etc.

Unlike many presently used agricultural microbiocides, the compounds employed in the practice of the invention exhibit a remarkably broad spectrum of activity against both bacterial and fungal phytopathogens. These compounds exhibit this activity even when used at the extremely low concentrations of five to five hundred parts per million, in contrast to many commercial products which must be used in concentrations up to several percent.

A further useful attribute of these compounds is that they are relatively water soluble or highly water dispersible, thus obviating the common need for expensive emulsifiers or dispersants which of necessity must be used with many present agricultural microbiocides to render them useful in spray applications. Conversely, even the most water-soluble chemical of this series is compatible with and can be used with an oil containing diluent if such is desirable in certain application techniques.

The physical properties of these compounds are such that they are suitable for different application methods such as aerial or ground spraying or mixing with soil by plowing. They may be used alone, diluted into solutions or dispersions, or further combined with other materials suitable for use as seed disinfectants or washes and preservatives for harvested fruits and vegetables. The surface-active characteristics of many of these compounds make them useful as disinfectants for fruit and vegetable packing and storage facilities.

Table 1 lists the phytopathogens against which one or more of these compounds have been tested, and describes representative diseases or conditions for which the organisms are responsible.

Table 2 gives examples of the compounds tested.

TABLE 1

| | |
|---|---|
| Botryodipoldia species | Banana spoilage. |
| Thielaviopsis sp | Do. |
| Mixed culture from banana crown | Do. |
| *Gloesporium musarum* | Banana spoilage and banana tree disease. |
| *Fusarium roseum gibbosum* | Banana spoilage; Panama disease. |
| *F. oxysporum vasinfectum* | Wilts of a large variety of plants. |
| *Verticillium theobromae* | Wilts of tropical plants. |
| *V. alboatrum* | Wilts of a wide variety of plants, especially, elm, maple, fruit trees, shrubs, bush fruits, roses, strawberries, eggplants, tomatoes, chrysanthemums, dahlias and other perennials. |
| *Rhizoctonia solani* | Root and stem diseases of solanaceous plants. |
| *R. solani* | Do. |
| *Phymatotrichum omnivorum* | Cotton root rot. |
| *P. omnivorum* | Do. |
| *Myrothecium roridum* | Root and stem rots of a wide variety of plants. |
| *M. verrucaria* | Do. |
| M. species | Cotton boll rot. |
| Diplodia species | Citrus "dieback." |
| Sclerotinia species | Stem and leaf rot of Bell of Ireland and related plants and wide variety of garden vegetables and flowers. |

TABLE 1.—Continued

| | |
|---|---|
| *Sclerotium vataticola* | Cotton root rot. |
| *Pseudomonas solanaceraum* | Various tropical plant diseases. |
| *Ps. solanacearum*, B | Diseases of bananas and other solanaceus plants. |
| *Ps. solanacearum*, T | Often associated with other strains of the same species in tropical plant dieease and diseases of many unrelated plants. |
| *Ps. syringae* | Pathogenic on lilac, citrus, peas, beans, cherries and many unrelated plants. |
| *Ps. tabaci* | Pathogenic on tobacco. |
| Penicillium sp | Spoilage of many vegetables and citrus fruits. |
| *Erwinia carotovora* | Rapid soft rot of roots, rhizomes, fruits, and fleshy stems of a wide variety of plants. |
| *Agrobacterium tumefaciens* | Galls on a wide variety of plants. |
| Mixed culture from St. Augustine grass | Lawn grass blight. |
| Botrytis sp | Gray mold blight of a wide variety of fruits, vegetables and ornamental plants. |

TABLE 2.—EXAMPLES OF COMPOUNDS TESTED

| Number | |
|---|---|
| 1 | The pyridine addition product of 2-nitro-1-butyl acid sulfate prepared by reacting 205 gm. of 2-nitro-1-butyl acid sulfate with 110 gm. of pyridine dissolved in 50 gm. of n-propanol at 30° C. followed by the addition of 100 gm. of water. |
| 2 | The sodium salt of 2-nitro-1-butyl acid sulfate prepared by adding 205 gm. of 2-nitro-1-butyl acid sulfate to a mixture consisting of 100 gm. of a 50% solution of sodium hydroxide, 100 gm. water and 50 gm. n-propanol at 30 ° C. |
| 3 | The product preapred by adding 199 gm. of 2-nitro-1-butyl acid sulfate to a mixture of 170 gm. of triethanolamine and 50 gm. of n-propanol at 30 ° C. followed by the addition of 100 gm. water. |
| 4 | The product prepared by adding 138 gm. of 2-nitro-1-butyl acid sulfate to 650 gm. of a 37.9% aqueous solution of the ethylene oxide adduct of dimethyl soy amine and reacting at 30° C. |
| 5 | The product prepared by adding 100 gm. of 2-nitro-1-butyl acid sulfate to 55 gm. of hexamethylene tetramine dissolved in 100 gm. of isopropanol and reacting at 30° C. |
| 6 | Cyclohexyl amine salt of 2-nitro-1-butyl acid sulfate. |
| 7 | Mixed primary decyl amine salts of 2-nitro-butyl acid sulfate. |
| 8 | NaOH reacted with nitro group of product of Example 1. |
| 9 | Triallyl amine salt of 2-nitro-1-butyl acid sulfate. |
| 10 | Hydrofuramide of 2-nitro-1-butyl acid sulfate. |
| 11 | Mixed tertiary alkyl ($C_{12}$–$C_{14}$) amine salt of 2-nitro-1-butyl acid sulfate. |
| 12 | Mixed tertiary alkyl ($C_{18}$–$C_{22}$) amine salt of 2-nitro-1-butyl acid sulfate. |
| 13 | Manganous salt of 2-nitro-1-butyl acid sulfate. |
| 14 | Stannic salt of 2-nitro-1-butyl acid sulfate. |
| 15 | Stannous salt of 2-nitro-1-butyl acid sulfate. |
| 16 | Zinc salt of 2-nitro-1-butyl acid sulfate. |
| 17 | Sulfoanylamine salt of 2-nitro-1-butyl acid sulfate. |
| 18 | Benzoguanamine salt of 2-nitro-1-butyl acid sulfate. |
| 19 | Tetrohydrofurfuryl amine salt of 2-nitro-1-butyl acid sulfate. |
| 20 | Menthane diamine salt of 2-nitro-butyl acid sulfate. |
| 21 | Diisopropyl amine salt of 2-nitro-1-butyl acid sulfate. |
| 22 | Dodecyl aniline salt of 2-nitro-1-butyl acid sulfate. |
| 23 | 30% aqueous solution copper salt of 2-nitro-1-butyl acid sulfate |
| 24 | Diphenylamine salt of 2-nitro-1-butyl acid sulfate. |
| 25 | Guanidine salt of 2-nitro-1-butyl acid sulfate. |
| 26 | 8-hydroxyquinoline base salt of 2-nitro-1-butyl acid sulfate. |
| 27 | 2-methylalanine salt of 2-nitro-1-butyl acid sulfate. |
| 28 | Tetrahydroxyethylethylene diamine salt of 2-nitro-1-butyl acid sulfate. |
| 29 | Mono-isobutyl amine salt of 2-nitro-1-butyl acid sulfate. |
| 30 | Copper salt of 2-nitro-1-butyl acid sulfate. |
| 31 | Solution of copper salt of 2-nitro-1-butyl acid sulfate. |
| 32 | Dianisidine base salt of 2-nitro-1-butyl acid sulfate. |
| 33 | p-Chloro-o-phenylenediamine salt of 2-nitro-1-butyl acid sulfate. |
| 34 | 1,4-bis(2-hydroxypropyl)-2-methylpiperazine salt of 2-nitro-1-butyl acid sulfate. |
| 35 | p-Aminoacetanilide salt of 2-nitro-1-butyl acid sulfate. |
| 36 | 2,4-diaminoanisole salt of 2-nitro-1-butyl acid sulfate. |
| 37 | n-Cyclohexyl-p-toluenesulfonamide salt of 2-notro-1-butyl acid sulfate. |

The following are representative formulations or mixtures containing one or more compounds of the examples above.

A

| | Gms. |
|---|---|
| Compound of Example— | |
| 2 | 30.0 |
| 1 | 30.0 |

B

| | |
|---|---|
| Compound of Example 1 | 18.0 |
| Mercaptobenzothiazole | 2.0 |

C

| | |
|---|---|
| Compound of Example 1 | 18.0 |
| Dimethylsulfoxide | 2.0 |

D

| | Gms. |
|---|---|
| Compound of Example 2 | 15.0 |
| Propanol | 3.0 |
| Mercaptobenzothiazole | 2.0 |

E

| | |
|---|---|
| Compound of Example 1 | 18.0 |
| $CuSO_4 \cdot 5H_2O$ | 2.0 |

F

| | |
|---|---|
| Compound of Example 2 | 17.0 |
| Ag soln. $Cu_2SO_4 \cdot 5H_2O$ (30%) | 3.0 |

G

| | |
|---|---|
| 5-nitro-2-furfural diacetate | 1.0 |
| Furfural | 4.0 |
| Composition A | 5.0 |

H

Compound of Example—

| | |
|---|---|
| 1 | 10.0 |
| 10 | 10.0 |

I

Compound of Example—

| | |
|---|---|
| 1 | 10.0 |
| 6 | 10.0 |

J

Compound of Example—

| | |
|---|---|
| 1 | 10.0 |
| 7 | 10.0 |

K

Compound of Example—

| | |
|---|---|
| 2 | 10.0 |
| 10 | 10.0 |

L

Compound of Example—

| | |
|---|---|
| 2 | 10.0 |
| 6 | 10.0 |

M

Compound of Example—

| | |
|---|---|
| 2 | 10.0 |
| 7 | 10.0 |

Compound of Example—

N

Compound of Example—

| | |
|---|---|
| 10 | 10.0 |
| 6 | 10.0 |

O

Compound of Example—

| | |
|---|---|
| 10 | 10.0 |
| 7 | 10.0 |

P

| | |
|---|---|
| Mercaptobenzothiazole | 2.0 |
| Furfural | 3.0 |
| Propanol | 5.0 |
| Compound of Example 1 | 20.0 |

Q

| | |
|---|---|
| Composition A | 9.0 |
| Mercaptobenzothiazole | 1.0 |

R

Compound of Example—

| | |
|---|---|
| 13 | 5.0 |
| 2 | 5.0 |
| Water | 5.0 |
| Propanol | 5.0 |

S

Compound of Example—

| | Gms. |
|---|---|
| 13 | 5.0 |
| 1 | 5.0 |

T

Compound of Example—

| | |
|---|---|
| 2 | 10.0 |
| 13 | 10.0 |

U

Compound of Example—

| | |
|---|---|
| 13 | 10.0 |
| 1 | 10.0 |
| Dispersing agent [1] | 2.0 |
| Methanol | 3.0 |

V

Compound of Example—

| | |
|---|---|
| 13 | 10.0 |
| 2 | 10.0 |
| 1 | 5.0 |
| Dispersing agent [1] | 2.0 |
| Methanol | 8.0 |

W

Compound of Example—

| | |
|---|---|
| 2 | 10.0 |
| 11 | 10.0 |

[1] 4.5 mole adduct of ethylene oxide in tridecyl alcohol.

In Tables 3 to 10 there are reported in parts per million of the chemicals tested in aqueous media the quantity of chemical required for an inhibitory concentration.

Test organisms were obtained from the stock culture collection of the University of Houston, Texas A & M University's Lower Rio Grande Valley Research and Extension Center and Lackland Experiment Station, or were isolated and identified by standard microbiological procedures from diseased fruits, vegetables, and plants (Methods used are disclosed in Society of American Bacteriologists, 1957, "Manual of Microbiological Methods" and Bergey's Manual of Determinative Bacteriology, 7 Ed.). Organisms were grown and testing was performed in standard liquid media appropriate for obtaining luxuriant growth of the respective species.

Inhibition tests to determine the effectiveness of compounds against Botryodiplodia species and Thielaviopsis species were conducted in standard potato-dextrose broth of the following composition:

Freshly peeled potatoes were boiled in distilled water for 20–30 minutes in the ratio of 200 gm. potato per liter of water. The broth was then filtered to remove solid particles of potato. To each liter of the filtered broth was added 20 gm. dextrose. All media were steam sterilized at 15 lb. pressure for 15 minutes.

Stock solutions of test chemicals were prepared as 100 p.p.m. (parts per million) chemical in distilled water. The stock solutions were then filter-sterilized into sterile containers.

All compounds were tested at concentrations of 5, 10, 30, 50, 100, 300, and 500 p.p.m. Proportionate amounts of the medium and test chemical solutions were aseptically added to sterile cotton-plugged 125 ml. Erlenmeyer flasks in a total volume of 30 ml. per flask. Each flask was inoculated with a standard bacteriological inoculating loopful of mycelia obtained from a potato-dextrose agar-slant culture of the test organism.

All flasks were incubated at 37° C. for a minimum of 48 hours and observed for growth of the test organism. Uninhibited growth control flasks were used for each test organism.

Inhibition tests to determine the effectiveness of the compounds against the other organisms were carried out by standard tube-dilution techniques using chemical concentrations of 5, 10, 20, 30, 40, 50 and 100 parts per million in media appropriate to the test organism. Inhibitory concentrations were determined after incubation periods ranging from one to seven days, depending upon the time required for uninhibited control tubes to show prolific growth.

All tests designate the concentration ranges at which inhibition occurred, the lower number indicating the highest concentration of chemical permitting growth, and the higher number indicating the lowest concentration at which no growth occurred. In some instances the compounds effectively prevented growth at 5 p.p.m. and the inhibitory concentration is shown as <5 (less than 5 p.p.m.).

TABLE 3.—INHIBITORY CONCENTRATION (PARTS PER MILLION) OF EXAMPLE

| Example: | Botryo-diplodia | Thiela-viopsis | Mixed Culture from banana crown | Gloe-sporium | Fusar-ium |
|---|---|---|---|---|---|
| 1 | 5-10 | <5 | <5 | 10-20 | 5-10 |
| 2 | <5 | <5 | 10-20 | | |
| 3 | 25-50 | 25-50 | | | |
| 4 | 10-20 | <5 | | | |
| 5 | 100-250 | 100-250 | | | |
| 6 | 40-50 | 40-50 | 40-50 | 40-50 | 50-100 |
| 7 | 40-50 | 20-30 | 50-100 | 30-40 | 50-100 |
| 8 | >100 | >100 | | | |
| 9 | 30-40 | 50-100 | | 50-100 | >100 |
| 10 | 10-20 | 20-30 | 40-50 | 40-50 | 40-50 |
| 11 | 30-40 | 5-10 | | | |
| 12 | <5 | <5 | 30-40 | | |
| 13 | 5-10 | <5 | 20-30 | | |
| 17 | 50-100 | | | | |
| 18 | 50-100 | | | | |
| 19 | 50-100 | | | | |
| 20 | 40-50 | | | | |
| 21 | 50-100 | | | | |
| 22 | 30-40 | | | | |
| 23 | 50-100 | | | | |
| 24 | 40-50 | | | | |
| 25 | 20-30 | 30-40 | | | |
| 26 | <5 | | | | |
| 27 | 10-20 | | | | |
| 28 | 20-30 | 5-10 | | | |
| 29 | <5 | 5-10 | | | |
| 30 | 30-40 | | | | |
| 31 | 30-40 | | | | |
| 32 | <5 | | | | |
| 33 | 10-20 | 30-40 | | | |
| 34 | >100 | | | | |
| 35 | 50-100 | | | | |
| 36 | 20-30 | | | | |
| 37 | <5 | | | | |

TABLE 4.—INHIBITORY CONCENTRATION (PARTS PER MILLION) OF EXAMPLE

| Example: | F. oxy-sporum vasin-fectum | Verti-cillium theo-bromae | Rhizoc-tonia solani | R. solan |
|---|---|---|---|---|
| 1 | <5 | <5 | 5-10 | <5 |
| 2 | | | 5-10 | |
| 6 | <5 | 10-20 | 20-30 | 40-50 |
| 7 | 40-50 | 5-10 | 40-50 | 10-20 |
| 9 | 50-100 | 10-20 | | 10-20 |
| 10 | 30-40 | <5 | 40-50 | 10-20 |
| 12 | | | 5-10 | |
| 13 | | | 30-40 | |
| 33 | >100 | 30-40 | | >100 |

TABLE 5.—INHIBITORY CONCENTRATION (PARTS PER MILLION) OF EXAMPLE

| Example: | Myro-thecium roridum | M. verru-caria | M. species | Diplodia species |
|---|---|---|---|---|
| 1 | 20-30 | <5 | 10-20 | 50-100 |
| 2 | | 10-20 | | |
| 6 | >100 | 40-50 | 50-100 | >100 |
| 7 | 50-100 | 50-100 | 50-100 | >100 |
| 9 | >100 | | 50-100 | >100 |
| 10 | >100 | 40-50 | 50-100 | >100 |
| 12 | | | 30-40 | |
| 13 | | | 10-20 | |
| 33 | | | >100 | |

TABLE 6.—INHIBITORY CONCENTRATION (PARTS PER MILLION) OF EXAMPLE

| Example: | Sclero-tinia | Sclero-tium batati-cola | Pseu-domonas solana-cearum | Ps. solana-cearum, B | Ps. solana-cearum, T |
|---|---|---|---|---|---|
| 1 | <5 | 50-100 | 5-10 | <5 | <5 |
| 6 | 40-50 | 50-100 | | 10-20 | <5 |
| 7 | 20-30 | 50-100 | 5-10 | 5-10 | |
| 9 | 50-100 | >100 | | 10-20 | |
| 10 | 10-20 | >100 | 10-20 | 10-20 | <5 |
| 11 | | | | <5 | 10-20 |
| 13 | | | | 5-10 | 20-30 |
| 25 | | | | 20-30 | |
| 26 | | | 20-30 | | |
| 27 | | | 20-30 | | |
| 28 | | | 30-40 | 50-100 | |
| 29 | | | 20-30 | 10-20 | |
| 30 | | | 30-40 | | |
| 31 | | | 10-20 | | |
| 32 | | | >100 | | |
| 33 | | >100 | 5-10 | <5 | |
| 34 | | | >100 | | |
| 35 | | | 40-50 | | |
| 36 | | | 10-20 | | |
| 37 | | | 10-20 | | |

TABLE 7.—INHIBITORY CONCENTRATION (PARTS PER MILLION) OF EXAMPLE

| Example: | Penicillium | Botrytis |
|---|---|---|
| 1 | 5-10 | 30-40 |
| 2 | 5-10 | 5-10 |
| 6 | 20-30 | 30-40 |
| 7 | 30-40 | >100 |
| 10 | 20-30 | >100 |
| 12 | 10-20 | >100 |
| 13 | 5-10 | 40-50 |

TABLE 8.—INHIBITORY CONCENTRATION (PARTS PER MILLION) OF MIXTURE

| Formulation or Mixture | Botryo-diplodia | Thiela-viopsis | Mixed Culture from banana crown | Gloes-porium | Fusarium roseum gibbosum |
|---|---|---|---|---|---|
| A | 10-20 | 5-10 | 20-30 | 10-20 | <5 |
| B | <5 | <5 | | | |
| C | 20-30 | | | | |
| D | 20-30 | | | | |
| E | 40-50 | | | | |
| F | 40-50 | | | | |
| G | 20-30 | 10-20 | | | |
| H | 50-100 | 10-20 | | | |
| I | 50-100 | 5-10 | | | |
| J | 20-30 | 5-10 | | | |
| K | 20-30 | 5-10 | | | |
| L | 10-20 | 5-10 | | | |
| M | 10-20 | 5-10 | | | |
| N | 10-20 | 20-30 | | | |
| O | 50-100 | 30-40 | | | |
| P | <5 | <5 | | | |
| Q | 5-10 | <5 | 20-30 | | |
| R | >100 | 5-10 | | | |
| S | 10-20 | <5 | | | |
| T | 10-20 | <5 | 10-20 | | |
| U | <5 | <5 | | | |
| V | 5-10 | <5 | | | |
| W | <5 | 5-10 | | | |

TABLE 9.—INHIBITORY CONCENTRATION (PARTS PER MILLION) OF MIXTURE

| Formulation or Mixture: | Rhizoc-tonia solani | Myro-thecium roridum (M-1) | M. verru-caria (M-2) | Diplodia |
|---|---|---|---|---|
| A | 10-20 | 5-10 | 10-20 | 30-40 |
| Q | <5 | | 10-20 | |
| T | 30-40 | | 10-20 | |

TABLE 10.—INHIBITORY CONCENTRATION (PARTS PER MILLION) OF MIXTURE

| Formulation or Mixture | Sclero-tinia | Ps. solana-cearum, B | Ps. solana-cearum, T | Penicillium | Mixed culture from St. Augustine Grass |
|---|---|---|---|---|---|
| A | 5-10 | <5 | <5 | <5 | 5-10 |
| B | | 30-40 | | | |
| Q | | | | 10-20 | 20-30 |
| T | | | | 5-10 | 20-30 |

Tests similar to those reported in Table 3 to 10 were conducted, using representative compounds in the presence of varying concentrations of such foreign organic matter as soaps, anionic, cationic, and nonionic detergents, banana latex, commercial banana stem paints, and fresh garden soil. Such organic matter did not cause significant decreases in the activity of the chemicals.

The compound of Example 1 was further tested as a preservative for bananas harvested from a commercial South American banana plantation under conidtions of actual use in shipment to the United States. Approximately 300 test boxes of bananas were included and handled in the usual manner in transit in a boatload of about 38,000 boxes. The test boxes were from a single packing station of one company, and were divided into three groups as follows:

(1) Controls were boxed with no unusual precautions and treated in the usual manner with a commonly used stem paint containing a commercial fungicide currently used in the banana industry.

(2) After the above were boxed and removed to trucks the packing station was thoroughly sprayed and washed with a 500 p.p.m. aqueous solution of the compound of Example 1.

(3) A 500 p.p.m. aqueous solution of the compound of Example 1 was substituted for the commonly used stem paint and fungicide referred to in Group 1 above.

After being unloaded from the boat the test boxes were placed in a storage room and held at a temperature of 58° F. for 8 days. The temperature was then raised to 68°–70° F. for 3 days to permit the fruit to ripen. On the twelfth day after storage was begun a total of 96 boxes of bananas distributed equally among the three groups were opened and 763 hands were examined and graded as follows:

Grade: | Description
0 ------ No evidence of fungus growth on crown.
1 ------ Fungus growth on crown surface only.
2 ------ Up to one-half of crown rotted.
3 ------ One-half to all of crown rotted.
4 ------ Rotting into the neck of fingers.

Fractions indicate intermediates between full grade:

|  | Group 1, Control Normal Treatment, Percent | Group 2, Example 1 and Usual Stem Paint, Percent | Group 3, Example 1, Percent |
|---|---|---|---|
| Grade: |  |  |  |
| 0.0 | 1.8 | 1.5 | 5.0 |
| 0.5 | 0.0 | 0.0 | 1.7 |
| 1.0 | 26.4 | 43.2 | 51.6 |
| 1.5 | 17.4 | 36.3 | 32.1 |
| 2.0 | 28.1 | 13.5 | 6.7 |
| 2.5 | 13.8 | 1.9 | 1.1 |
| 3.0 | 8.4 | 1.5 | 1.1 |
| 3.5 | 0.6 | 0.0 | 0.0 |
| 4.0 | 3.6 | 2.0 | 1.5 |

The following table shows a summary based on fitness of the fruit for marketing. Grades in the range of 1.5 or less are highly desirable. Grades 2.0 to 3.0 can be used on local markets near storage points. Grades 3.0 to 4.0 or higher are usually marketed, if at all, at a financial loss.

|  | Group 1 | Group 2 | Group 3 |
|---|---|---|---|
| Total percent 1.0 or less | 28.2 | 44.7 | 58.3 |
| Total percent 1.5 or less | 45.6 | 81.0 | 90.4 |
| Total percent 2.0 or greater | 54.5 | 18.9 | 10.4 |
| Total percent 3.0 or greater | 12.6 | 3.5 | 2.6 |

Totals above not equal to 100.0% are the result of rounding-off to nearest 0.1 in initial calculations.

From the foregoing test data it will be seen that compounds within the scope of the invention are remarkably effective in inhibiting deterioration of bananas.

The invention is hereby claimed as follows:

1. A process for destroying microorganisms found in agriculture selected from the group consisting of: Botryodiplodia species, Thielaviopsis sp., mixed culture from banana crown, *Gloesporium musarum, Fusarium roseum gibbosum, F. oxysporum vasinfectum, Verticillium theobromae, V. alboatrum, Rhizoctonia solani, R. solani, Phymatotrichum omnivorium, P. omnivorum, Myrothecium roridum, M. verrucaria,* M. species, Diplodia species, Sclerotina species, *Sclerotium bataticola, Pseudomonas solanacearum, Ps. solanacearum B., Ps. solanacearum T, Ps. syringae, Ps. tabaci,* Penicillium sp., *Erwina carotovora, Agrobacterium tumefaciens,* mixed culture from St. Augustine grass, and Botrytis sp. which comprises contacting said microorganisms in an aqueous environment with a biocidal amount of an organic compound having a nitrobutyl sulfate nucleus.

2. A process as claimed in claim 1 in which said microorganisms are Botryodiplodia sp.

3. A process as claimed in claim 1 in which said microorganisms are Thielaveopsis sp.

4. A process of treating bananas to retard deterioration which comprises washing the bananas with an aqueous solution containing a biocidal amount of a nitrobutyl acid sulfate.

5. A process of treating bananas to retard deterioration which comprises washing the bananas with an aqueous solution containing a biocidal amount of an amine salt of a nitrobutyl acid sulfate.

6. A process of treating bananas to retard deterioration which comprises washing the bananas with an aqueous solution containing a biocidal amount of an amine salt of a 2-nitro-1-butyl acid sulfate.

7. A process of treating bananas to retard deterioration which comprises washing the bananas with an aqueous solution containing a biocidal amount of the addition product of pyridine and 2-nitro-1-butyl acid sulfate.

References Cited

McInnis et al., J. Am. Chem. Soc. vol. 74, p. 2686 (1952), QD 1.A5; also C.A. vol. 48, col. 256a, QD1A51.

Nightingale, J. Am. Chem. Soc. vol. 66, pp. 352–4 (1944), QD1.A5.

A. LOUIS MONACELL, *Primary Examiner.*

J. M. HUNTER, *Assistant Examiner.*

U.S. Cl. X.R.

99—156; 424—263